Patented May 2, 1944

2,348,039

UNITED STATES PATENT OFFICE 2,348,039

COMPOSITION AND PROCESS FOR TREATING FIBROUS MATERIALS

Heinrich Ulrich, Ernst Ploetz, and Eberhard Nold, Ludwigshafen-on-the-Rhine, Germany; vested in the Alien Property Custodian No Drawing. Application December 31, 1940, Serial No. 372,566. In Germany January 25, 1940

20 Claims. (Cl. 260—28)

The present invention relates to media for the improvement of fibrous materials.

We have found that dispersions containing paraffin waxes or substances of similar physical nature and water polymerized alkylene imines or conversion products thereof, are highly efficient media for the improvement of fibrous materials, such as textiles, leather or paper. The dispersions may be made in any desired manner with or without the application of dispersing agents and/or protective colloids.

As suitable polymerized alkylene-imine substances we mention, for example, the polymerization products of ethylene-imine, 1.2-propylene-imine, 1.3-propylene-imine, 1.2-butylene-imine, N-methylethylene-imine, N-cyclohexylethylene-imine or phenylethylene-imine. As paraffin waxes or substances of similar physical nature we may mention hard paraffin wax, soft paraffin wax, chlorinated paraffin waxes, paraffin oil, carnauba wax, Japan wax, montan wax, stearic acid, the esters, anhydrides or amines thereof, octodecylamine, octodecyl alcohol, dodecylcyclohexanol, montanyl alcohol, tallow, sperm-aceti oil, ketones from high-molecular fatty acids and the alcohols and hydrocarbons obtainable from these ketones by reduction, furthermore octodecylpolyvinyl ether, isobutylpolyvinyl ether and the like. Mixtures from several of the aforesaid substances are also suitable for the purposes of the present invention.

In preparing the emulsions we may employ as dispersing agents, for example, soaps, water-soluble salts of alkylnaphthalenesulphonic acids or of sulphonation products from olefines or higher-molecular alcohols, furthermore polyglycol ethers from fatty alcohols or high molecular aliphatic amines, or fatty acid polyglycol esters. As protective colloids may be used, for example, glue, gelatine, agar-agar or dextrine.

In preparing the dispersions it is preferable to employ the paraffin wax or the substance of similar physical nature in preponderance to the polymerized alkylene-imine. Thus, for example, the dispersions may contain from about 20 to 30 per cent of paraffin and from 1 to 10 per cent, advantageously only about 1 to 5 per cent, of polymerized alkylene-imine. Besides the said constituents, the dispersions may yet contain other constituents, such as are compatible with the constituents already present, as for example dyestuffs, plasticizers, inorganic salts, zinc oxide, titanium dioxide, zirconium oxide, aluminum hydroxide, urea or starch.

The treatment of the fibrous materials, for example textiles, may be performed by employing baths in which the said dispersions have been incorporated. The materials so treated are then dried and, if desired, subsequently heated for a longer time, for example at about 80 to 100° C. While treating the materials with the dispersions or while subjecting the so treated materials to the subsequent drying and heating treatment, it is often of advantage to treat them simultaneously with aldehydes, such as formaldehyde, paraformaldehyde or acetaldehyde.

By treating textiles, such as cotton, wool or artificial silk fabrics, papers or leather with the dispersions according to the present invention, an excellent and long-lasting water-repellent effect is imparted to them. According to the substances contained in the dispersions in addition to the alkyene-imine, the fibrous materials simultaneously are imparted an excellent softness or fullness and/or surface smoothness. They may also get an increased affinity to acid dyestuffs and/or a diminished absorptiveness to water. When applied to paper, the treatment with the dispersions especially effects a good fastness to moisture as well as to rubbing in a wet state.

The following examples serve to illustrate how the present invention may be carried out in practice, but the invention is not restricted to the said examples. The parts are by weight.

Example 1

100 parts of polymerized ethylene-imine are dissolved in 700 parts of water at 70° C., whereupon a mixture of 392 parts of soft paraffin wax and 168 parts of paraffin oil, having been heated to about 100° C., is finely distributed in the said solution by means of a dispersing machine. The emulsion is then diluted with 640 parts of water at a temperature of 70° C. and then passed through a homogenizing machine for some minutes under a pressure of 120 atmospheres. The finished emulsion is allowed to cool.

A viscous artificial silk fabric is soaked in a bath to each liter of which the dispersion so obtained has been added in an amount of 10 to 100 grams, and then dried on a drum at from 100 to 110° C. By this treatment the fabric is made markedly water-repelling, its perviousness to air being unimpaired.

Example 2

70 parts of polymerized ethylene-imine are dissolved in 220 parts of water at a temperature of 70 C. and then a mixture of 220 parts of hard paraffin wax and 11 parts of colophony, fused at about 100° C., is distributed in the solution so obtained by means of a dispersing machine. The emulsion is then diluted with another 200 parts of water, pumped through a homogenizing machine for some minutes under a pressure of 70 to 80 atmospheres and afterwards united with a mixture of 200 parts of a solution of an aluminum oxide gel, 60 parts of formic acid and 39 parts of water. The emulsion obtained is then allowed to cool.

*Example 3*

250 parts of a hydroxyethylated stearic acid monoethanol amide are intimately mixed with 750 parts of an aqueous solution containing 50 parts of polymerized ethylene-imine under vigorous agitation until a homogeneous emulsion results. Fabrics of cell-wool treated with solutions containing from 2 to 4 per cent of the emulsion so obtained are imparted a soft and smooth touch which remains unaffected by washing.

*Example 4*

250 parts of octodecyl alcohol are melted and mixed with a 13 per cent solution of polymerized ethylene imine in a turbo mixer. The dispersion so obtained is stable and may be easily diluted. Fabrics treated with the diluted dispersion are imparted a soft touch and water-repelling properties.

What we claim is:

1. The process of improving fibrous materials by treating these materials with a dispersion, containing a paraffin wax, water and a polymerized alkylene-imine, the wax being present in a preponderant amount with respect to the polymerized alkylene-imine.

2. The pricess of improving fibrous materials by treating these materials with a dispersion, containing a paraffin wax, water and polymerized ethylene-imine, the wax being present in a preponderant amount with respect to the polymerized ethylene-imine.

3. The process of improving fibrous materials by treating these materials with a dispersion, containing soft paraffin wax, water and polymerized ethylene-imine, the wax being present in a preponderant amount with respect to the polymerized ethylene-imine.

4. The process of improving fibrous materials by treating these materials with a dispersion, containing hard paraffin wax and polymerized ethylene-imine, the wax being present in a preponderant amount with respect to the polymerized ethylene-imine.

5. The process of improving fibrous materials by treating these materials with a dispersion, containing a hydroxyethylated stearic acid monoethanol amide, water and polymerized ethylene-imine, the amide being present in a preponderant amount with respect to the polymerized ethylene-imine.

6. As new article of manufacture a dispersion containing a paraffin wax, water and a polymerized alkylene-imine, the wax being present in a preponderant amount with respect to the polymerized alkylene-imine.

7. As new article of manufacture a dispersion containing a paraffin wax, water and a polymerized ethylene-imine, the wax being present in a preponderant amount with respect to the polymerized ethylene-imine.

8. As new article of manufacture a dispersion containing soft paraffin wax, water and a polymerized ethylene-imine, the wax being present in a preponderant amount with respect to the polymerized ethylene-imine.

9. As new article of manufacture a dispersion containing hard paraffin wax, water and a polymerized ethylene-imine, the wax being present in a preponderant amount with respect to the polymerized ethylene-imine.

10. As new article of manufacture a dispersion containing a hydroxy ethylated stearic acid monoethanol amide, water and a polymerized ethylene-imine, the amide being present in a preponderant amount with respect to the polymerized ethylene-imine.

11. Improved fibrous materials containing a paraffin wax and a polymerized alkylene-imine, the wax being present in a preponderant amount with respect to the polymerized alkylene-imine.

12. The process of improving fibrous materials which comprises impregnating said materials with a dispersion comprising water, a polymerized alkylene-imine and a long chain water-repellency producing substance selected from the class consisting of waxes, octadecyl alcohol, dodecylcyclohexanol, montanyl alcohol, octadecylamine and a hydroxy ethylated stearic acid monoethanolamide, said substance being present in a preponderant amount with respect to the polymerized alkylene-imine.

13. A dispersion comprising water, a polymerized alkylene-imine and a long chain water-repellency producing substance selected from the class consisting of waxes, octadecyl alcohol, dodecylcyclohexanol, montanyl alcohol, octadecylamine and a hydroxy ethylated stearic acid monoethanolamide, said substance being present in a preponderant amount with respect to the polymerized alkylene-imine.

14. A process as in claim 12 in which 20 to 30% of the long chain compound and 1 to 10% of the polymerized imine are present in the dispersion, and in which the impregnated materials are dried and heated to a temperature from about 80 to 100° C.

15. A process of rendering fibrous materials water repellent which comprises impregnating such materials with an aqueous dispersion containing from 20 to 30% of a paraffin wax, 1 to 10% of a polymerized alkylene-imine and subsequently drying and heating the impregnated materials to a temperature of from substantially 80 to 100° C.

16. A process as in claim 15 in which the fibrous materials are treated at least simultaneously with the application of the dispersion with an aldehyde selected from the group consisting of formaldehyde, paraformaldehyde and acetaldehyde.

17. A process of rendering fibrous materials water-repellent which comprises impregnating the fibrous materials with an aqueous dispersion containing polymerized ethylene-imine, soft paraffin wax and paraffin oil, and then drying the impregnated material at a temperature of from 100 to 110° C., the wax being present in a preponderant amount with respect to the polymerized ethylene-imine.

18. An aqueous dispersion for the treatment of fibrous materials which comprises polymerized ethylene-imine, hard paraffin wax, colophony, aluminum oxide gel and formic acid, the wax being present in a preponderant amount with respect to the polymerized ethylene-imine.

19. A process for rendering fibrous materials water-repellent which comprises impregnating the fibrous materials with an aqueous dispersion containing octadecyl alcohol and polymerized ethylene-imine, the octadecyl alcohol being present in a preponderant amount with respect to the polymerized ethylene-imine.

20. Improved fibrous materials containing a long chain water-repellency producing substance selected from the class consisting of waxes, octadecyl alcohol, dodecylcyclohexanol, montanyl alcohol, octadecylamine and a hydroxy ethylated stearic acid monoethanolamide, said substance being present in a preponderant amount with respect to the alkylene-imine, said fibrous material having water-repellent properties and a soft and smooth feel.

HEINRICH ULRICH.
ERNST PLOETZ.
EBERHARD NOLD.